May 9, 1961     D. W. NORWOOD     2,983,186
DEVICE WITH THREE DIMENSIONAL LIGHT COLLECTOR
Filed March 10, 1959
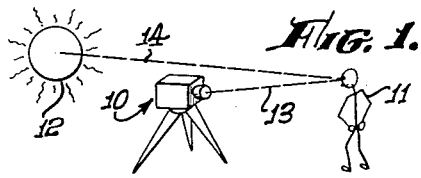
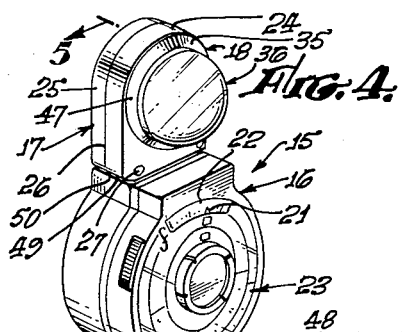
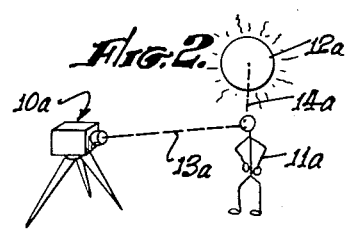
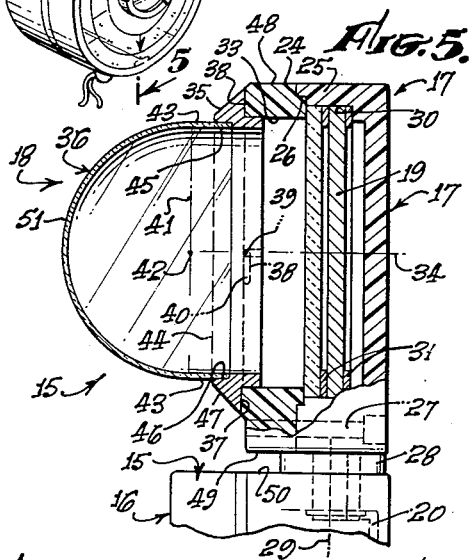
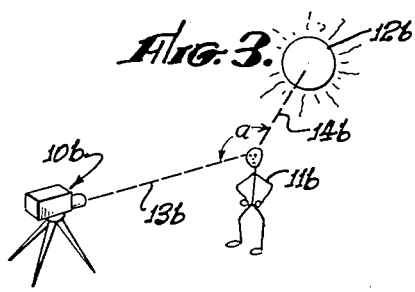
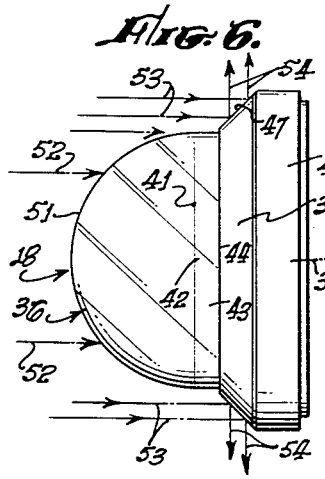
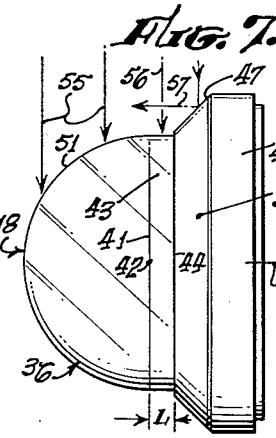
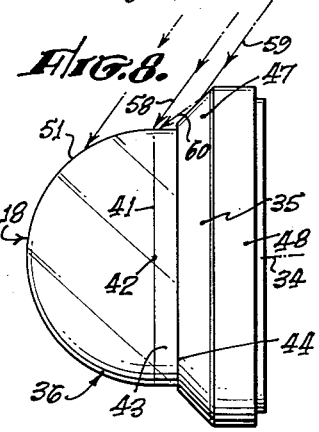
DONALD W. NORWOOD,
INVENTOR.
BY *William P. Green*
ATTORNEY.

United States Patent Office 2,983,186
Patented May 9, 1961

2,983,186

DEVICE WITH THREE DIMENSIONAL LIGHT COLLECTOR

Donald W. Norwood, 1470 San Pasqual St., Pasadena, Calif.

Filed Mar. 10, 1959, Ser. No. 798,459

16 Claims. (Cl. 88—23)

This invention relates to an improved photographic light responsive device, such as a light meter, and is particularly concerned with a unique light collecting arrangement for such a device. The collector of the present application is an improvement on the incident light type of collector structure disclosed in my U.S. Patent No. 2,214,283, issued September 10, 1940 on "Exposure Meter."

In my above mentioned prior patent, I disclosed a device having a distinctive three dimensional type of light collecting unit, so shaped as to be illuminated in a manner closely simulating the manner of illumination of any three dimensional photographic subject. In using a device of this type, the light collector unit is normally directed toward the camera from the location of the subject, so that the energization of the device as a result of the illumination of the three dimensional light collector unit will take into account and integrate all of the photographically effective light which is incident upon the meter, and will produce a camera setting which is much more accurate and reliable than where a reflected light type of device is employed.

The light collector element of the above mentioned patent takes the form of a translucent shell or dome, projecting outwardly in a convex configuration so that light can fall on the dome from any source which is so positioned as to have a significant illuminating effect for photographic purposes. More specifically, the dome is shaped to be illuminated by front light, side light, and by back lighting so far as that back lighting is effective photographically. To attain this result, the light collector dome of my prior patent was essentially hemispherical in shape, or as indicated in the patent could consist of a large number of planar surfaces forming together an overall convex dome whose light collecting characteristics were the equivalent of a hemispherical element.

As will be apparent, light directed toward a photographic subject from the side (as viewed from the camera) is considerably less effective in illuminating the subject than would be the same light directed toward the front of the subject. Further, as the light source advances to a back lighting position, the same light source becomes even less effective. A hemispherical three dimensional light collector element of the above discussed type automatically takes into account this decreasing effectiveness of a light source as the source moves from a front lighting position to a side lighting or back lighting position. Under front lighting conditions, the entire face of the hemispherical light collector is illuminated, so that the meter gives a maximum reading. If the light source is moved to the side of the camera-subject axis, only about one-half of the hemisphere is illuminated, and the meter reading is therefore considerably lower. As the light source moves toward a back lighting position, less and less of the hemisphere is illuminated, so that the meter reading progressively decreases.

At the time that the device disclosed in my prior Patent No. 2,214,283 was designed, it was considered desirable by most photographers that the camera lens settings used under front and side lighting conditions differ from one another by one full $f$-stop, assuming that the intensity of the light source remained the same. That is, if a particular $f$-stop setting were determined to be proper under a certain front lighting condition, then the camera lens aperture should be opened up one full $f$-stop more if the same light source were located at a side lighting position. With the same light source in a back-lighting position, it was considered that the lens aperture should be opened up another full $f$-stop.

The hemispherical light collector dome of my prior patent was so designed as to inherently and automatically give this desired one full $f$-stop differential in reading between front and side lighting conditions, and between side and back lighting conditions. Since the issuance of that patent, however, the characteristics of films have changed considerably, and the opinions of photographers as to what lighting effects are aesthetically most desirable have also changed. With particular reference to the relationship between front, side and back lighting, the film manufacturing companies are now suggesting a differential of only one-half $f$-stop in camera setting as between front light and side lighting, and between side lighting and back lighting. Many expert photographers feel that the proper differential is two-thirds of an $f$-stop between these various steps, but at any rate it is clear that the full $f$-stop differential previously recommended should no longer be used.

The general object of the present invention is to provide an improved light collector unit which is basically very similar to that disclosed in my Patent 2,214,283, and therefore has the advantages attained by the device of that patent, but which is especially constructed to increase the relative response of the collector to side-lighting and back-lighting sources, to thus decrease the differential between front, side and back-lighting conditions below the one full $f$-stop differential of my prior device. As will appear, the increase in response to side-lighting rays is attained by providing an added portion of the light collector shell or dome which is so shaped and positioned as to be illuminated by light from the side of the device but not by light from the front. An increase in response to back-lighting is attained by providing a highly reflective tapering surface closely adjacent the translucent light collector shell, and so positioned as to reflect back-lighting rays onto the shell to increase its illumination.

The above and other features and objects of the present invention will be better understood from the following detailed description of the typical embodiment illustrated in the accompanying drawing in which:

Figs. 1, 2 and 3 represent the relationship between camera, subject and light source under front-lighting, side-lighting and back-lighting conditions;

Fig. 4 is a perspective view of a light meter constructed in accordance with the invention;

Fig. 5 is an enlarged fragmentary section taken on line 5—5 of Fig. 4; and

Figs. 6, 7 and 8 show the manner of impingement of light rays on the light collector portion of the Fig. 4 meter under front lighting, side lighting and back lighting conditions respectively.

Figs. 1 to 3 have been included in the present drawing in order to make it completely clear what is meant by the three terms "front lighting," "side lighting" and "back lighting." In Fig. 1, I have shown an arrangement in which the camera 10 is directed toward a subject 11 with the primary light source 12 being located essentially behind the camera, so that the light rays travelling from source 12 to subject 11 travel essentially along and parallel to the camera-subject axis 13. In this front lighting condition, the entire camera side of the subject 11 is illuminated. Fig. 2 shows a side lighting condition, in which the axis 14 extending from light source 12a to subject 11a is disposed at an angle of 90 degrees with respect to the camera-subject axis 13a. Fig. 3 shows a back lighting condition, in which the light source 12b is located behind subject 11d, so that the light axis 14b is disposed at an angle a to the camera-subject axis 13b. The term back lighting in the present application will be utilized primarily to refer to a condition in which the angle a of Fig. 3 is 135 degrees, since any light coming from farther behind the subject than this 135 degree position may be ignored in determining a proper camera lens setting.

The light meter represented at 15 in Fig. 4 includes a meter body 16, carrying an upper reduced dimension light pick up head 17. Head 17 carries a light collector unit 18 constructed in accordance with the invention, which illuminates and controls the energization of a light responsive element 19 (Fig. 5) located within head 17. Element 19 may be a photovoltaic cell, whose output voltage is conducted to and actuates a microammeter 20 located within the main body 16 of meter 15. This microammeter has a swinging movable pointer 21, which is visible to an operator from the outside of body 15, and which is located adjacent a scale 22 in the body, to indicate different camera settings corresponding to different extents of illumination of the light collector unit 18. The scale 22 may read directly in terms of f-stop or lens aperture settings for the camera, assuming the use of a particular film and shutter speed. The front face of main body 16 of the meter may carry a calculator device, for converting the direct reading of pointer 21 to an alternate reading usable under different shutter time and film sensitivity conditions.

As seen clearly in Fig. 5, the head 17 of meter 15 may include two sections or parts 24 and 25, typically formed of an opaque resinous plastic material, and abutting against one another at 26. These two parts 24 and 25 are secured tightly together in any suitable manner, as by screws represented at 27. Head 17 may be attached to body 15 by means of a swivel connection 28, mounting the head for relative rotation about an axis 29. The wires for conducting electricity from photovoltaic cell 19 to microammeter 20 may pass through the interior of this swivel connection 28. Cell 19 typically takes the form of a circular disc, mounted within a circular recess 30 formed in part 25, and with the electrical connections to cell 19 being made by a pair of annular electrically conductive contact rings 31. In front of disc 19, there may be provided a clear disc of glass 32, for protecting cell 19 without interfering with the passage of light thereto.

Forward part 24 of head 17 contains a circular or cylindrical passage 33, whose axis 34 coincides with the central axis of recess 30, disc 19, and window 32. As will be apparent, parts 24 and 25 are so designed that light can enter these parts and pass to photovoltaic cell 19 only from the forward end of part 24, and through the light collector unit 18.

In the preferred form of the invention, as shown in the figures, light collector unit 18 includes an annular mounting and reflector ring 35, and a translucent light collecting dome 36 attached to ring 35. The ring 35 has a cylindrical external surface 136 (see Fig. 5) of a diameter to fit closely within bore 33 and part 25. The insertion of ring 35 into bore 33 is limited by engagement of a transverse annular radially extending shoulder 37 on part 35 with a correspondingly transverse front surface 37 of part 24. At two diametrically opposite locations, ring 35 has, in its outer surface 136, a pair of bayonet slots or grooves 38 (only one seen in Fig. 5), within which there is receivable a radially inwardly projecting pin 39 carried by part 24, to removably secure ring 35 in the illustrated position of Figs. 4 and 5 with respect to part 24. As will be understood, ring 35 is attached to part 24 by merely slipping ring 35 axially into part 24, with pins 39 received in the axially extending portions of grooves 38, following which ring 35 is turned relative to part 24 to move pins 39 into their locking positions at the ends of the circularly extending portions 40 of grooves 38, all in the manner of a conventional bayonet connection.

The hollow convex light collector dome 36 may be formed of any suitable translucent material, for example a suitable milky appearing resinous plastic material, typically cellulose acetate. This translucent material is illuminated by any light which falls on the dome 36, and that light is transmitted through the thickness of dome 36 to its interior, from which the light is transmitted inwardly to light responsive cell 19. The light is diffused by virtue of the translucence of dome 36, and passes in diffused form to cell 19.

In describing the precise configuration of the dome 36 as seen in the figures, first let us consider the portion of the dome 18 which is located to the left of a plane 41 extending transversely of axis 34 of the device at a location spaced outwardly a short distance from ring 35. Outwardly beyond this plane 41, dome 36 may be considered, in its preferred form, as being an exact hemisphere, centered about a point 42 located at the intersection of axis 34 and plane 41. In my prior Patent 2,214,283, the entire light collector element took the form of a simple hemisphere corresponding to the hemispherical portion of dome 36 in the present device. To define this hemispherical light collecting surface and its possible variants somewhat more broadly, this surface was defined in my prior patent, and may be similarly defined here, as "being composed of a plurality of substantially contiguous surface portions arranged in convex surface configuration and so disposed that the normals thereto lie within and are distributed over a solid angle of substantially $2\pi$ steradians." This broad definition of the hemispherical portion of the device would cover a variation in which the convexity might depart materially from a true hemispherical surface, or in which a series of polyhedral surfaces approximating the desired convexity might be employed.

Inwardly or rearwardly beyond the hemispherical portion of dome 36, the dome desirably has a straight cylindrical portion 43, centered about axis 34, and of a diameter corresponding to the diameter of the forward hemispherical portion of dome 36, so that the portion 43 forms in effect a cylindrical rearward extension of the rear edge portion of the hemisphere. The cylindrical portion 43 is exposed for transmission of light therethrough, to the location of a second transverse plane 44 extending parallel to plane 41. Inwardly beyond that plane 44, dome 36 has an extended cylindrical portion 45, which is received within a bore 46 in ring 35, and is tightly cemented or otherwise secured in that bore in fixed relation to ring 35.

The ring 35 is particularly characterized by the provision of an annular tapering reflector surface 47 on the ring at a location closely proximate to dome 36. This surface 47 tapers toward a reduced diameter as the surface advances axially toward the outer end of dome 36, the taper desirably being frustro-conical as shown. Surface 47 may be disposed at an angle of between about 120 and 145 degrees with respect to axis 34, and preferably about 135 degrees to said axis. The outer surfaces 48 of parts 24 and 25 may curve cylindrically about axis 34, at a diameter slightly greater than the maximum diameter of ring 35, and in a relation such that parts 24 and 25 do not interfere with the passage of light to dome 36 over most of the circular extent of the light collector. The bottom portions of parts 24 and 25 may extend downwardly as seen in Fig. 4, to the location of a planar undersurface 49 extending parallel to and closely adjacent to a planar upper surface 50 of body 15.

Ring 35 may be formed of a suitable metal having the desired light reflective characteristics for surface 47, the metal being desirably a silvery white metal, such as aluminum, duralumin or magnesium. The highly reflective surface 47 desirably has a coefficient of reflection R of at least about .4, for all visible light, and may be either a smooth mirror surface or a diffused reflector surface such as a satin finish surface. The short tapering surface 50 on part 24 may be tapered frustro-conically in correspondence with reflective surface 47.

To now describe the manner of use of the illustrated device, assume first that the meter is to be utilized in a front lighting situation such as that represented in Fig. 1. In this situation, the meter may be held at the location of the subject, with the light collector dome 36 pointed directly at camera 10, so that axis 34 of the meter structure coincides with the camera-subject axis 13. Fig. 6 shows the manner in which the light from source 12 then affects light collector structure 18 in the front lighting situation of Fig. 1. In the first place, it is noted that those light rays which fall within the projected area of hemispherical portion 51 of dome 36, for example rays 52 in Fig. 6, impinge directly on the hemisphere and illuminate it, and are therefore transmitted in diffused form by the hemisphere to photovoltaic cell 19. Assuming that axes 34 and 13 are in exact coincidence, none of the light rays can impinge upon cylindrical portion 43 of dome 36, and those rays (53) which fall on reflector surface 47 of ring 35 are reflected radially outwardly as at 54, so that they can not fall on or affect the hemispherical collector dome 36. Thus, in this Fig. 6 front lighting condition, the energization of cell 19 is substantially the same as in my prior patent, where the cylindrical collector surface 43 and the tapering reflector surface 47 were not provided.

In a side lighting condition such as that represented in Figs. 2 and 7, some of the rays 55 fall directly on hemisphere 51, and also some of the rays (as at 56) fall directly on the cylindrical light collector surface 43. All of these rays 55 and 56 illuminate the light collector dome, and are transmitted in diffused form to element 19, so that element 19 in this side lighting condition receives substantially more light than if only a hemispherical collector were employed. The added light is of course transmitted by the cylindrical portion 43 of the dome. That light which falls on reflector surface 47 is reflected forwardly as indicated at 57, and does not impinge upon any portion of dome 36. The added light energization of the cell 19 resulting from the provision of cylindrical surface 43 is sufficient to reduce the difference in reading of pointer 21 as between front lighting and side lighting conditions (other conditions remaining the same) to substantially less than a one *f*-stop differential. This differential between the front and side lighting conditions should preferably be between about ¼ and ⅝ of an *f*-stop, and for optimum results should be about ⅔ of an *f*-stop.

When the illumination is of a back lighting character, as represented in Figs. 3 and 8, some of the light rays fall directly on hemisphere 51 and cylinder 43, as indicated at 58, but this direct illumination is of course less effective than in the Fig. 7 side lighting condition. The direct illumination of dome 36 in Fig. 8 is supplemented by rays as represented at 59 of Fig. 8 which impinge upon reflector surface 47 and are reflected thereby (as at 60) in a direction to fall on either the hemispherical or cylindrical portion of dome 36. This added illumination of the dome resulting from the reflections attained by surface 47 acts to decrease the differential between the illumination of dome 36 in a side lighting condition and its illumination in a back-lighting condition. The effect attained in this manner is desirably sufficient to reduce the differential as between Figs. 7 and 8 to a value corresponding to the differential between Figs. 6 and 7, that is, a differential between about ¼ and ⅝ of an *f*-stop, and preferably about two-thirds of an *f*-stop. When the light reaches a back lighting position which is beyond the 135 degree angle of surface 47, that is, when the angle *a* in Fig. 3 becomes greater than 135 degrees, the lighting effectiveness of the source on subject 11b decreases to a point at which it may be ignored in determining a proper camera setting. The design of the light collector and mount takes cognizance of this fact, since the opaque parts 24, 25 and 35 act to shield the light collector dome 36 from any rays which may emanate from a point farther behind the subject than where the angle *a* of Fig. 3 is equal to 135 degrees.

It may be noted that although certain specific angular relationships between the camera to subject axis and the light source to subject axis have been described, the various relationships and effects discussed are in fact continuously progressive from the 0 degree angle condition to the 135 degree condition. The apparatus of the invention is so designed as to accurately respond to any stage of this progressive change. The end result is optimum quality pictures at every angle.

The invention offers considerable flexibility in design, by virtue of which the exact desired relationship between luminous level of reproduction of each of front lighted, side lighted and back lighted subjects may be achieved. Increase of relative length of the cylindrical portion of the light collector will tend to decrease the luminous appearance of the pictured subject in the case of side or back lighting. Increase of the relative area of the conical reflecting surface of the mount will tend to decrease the luminous appearance of the pictured subject in the case of back lighting. As aesthetic considerations change from time to time, or as the requirements of different recording mediums change, the design of the elements of the invention may be modified as described, to provide the precise end results desired.

It will be appreciated that while the foregoing description has included three cooperating elements, namely, hemisphere, cylinder and conical reflector; any two of them will also form a unique cooperating combination. Thus the hemisphere and the conical reflector may be used in combination. Or the hemisphere and the cylinder may be used in combination. Or the cylinder and the conical reflector may be used in combination. Any of these various possible combinations would attain certain of the advantages of the invention, though the optimum arrangement is of course the one illustrated where all three elements are employed together.

While the portion 43 of collector dome 36 has been described as preferably being cylindrical in configuration, it is contemplated that this portion beyond the hemisphere might in some instances actually have a slight taper, typically taking the form of a short frustrum of a cone of very slight taper. The taper would have to be small enough, however, to render portion 43 primarily responsive to side light, and not more than very slightly responsive to front light, to thereby serve the intended function of decreasing the differential between front lighting and side lighting conditions. The most effective arrangement is of course one where portion 43 is a true cylinder, as shown.

The preferred relationship between the cylindrical and spherical portions of dome 36 may be defined somewhat more specifically as follows. If the hemisphere 51 (or its equivalent) has a radius *r*, then the axial length L (see Fig. 7) of the cylindrical or approximately cylindrical light collector surface 43 should desirably be between about .09*r* (corresponding to a ⅝ *f*-stop differential between front and side lighting) and .53*r* (¼ *f*-stop differential), and preferably about .2*r* (⅔ *f*-stop differential).

I claim:

1. A photographic light responsive device comprising a body structure, a translucent three-dimensional light collecting shell projecting outwardly from said body in the direction in which a predetermined axis extends, a light sensitive element positioned behind said shell at a location to be energized by light passing therethrough, and means actuable by said light sensitive element to positions corresponding to different f-stop settings for a camera, said translucent shell having a forward portion shaped essentially convexly to collect light rays from either a front lighting source directed toward the shell along said axis or a side lighting source directed substantially transversely of the axis, said forward convex portion being dimensioned so that the light collected thereby from a front source and a side source of equal intensity will actuate said means to call for a camera lens setting approximately one full f-stop more open under side lighting conditions than under front lighting conditions, other factors remaining the same, said shell having a translucent light passing side wall axially inwardly of the inner end of said convex portion and extending approximately directly axially to respond almost entirely to side lighting and not appreciably to front lighting, said side wall of the shell being of sufficient axial length to reduce the differential between front lighting and side lighting conditions of said means to an amount corresponding to considerably less than one full f-stop.

2. A photographic light responsive device as recited in claim 1, in which said convex portion of the shell is essentially hemispherical, and said side wall thereof is substantially cylindrical.

3. A photographic light responsive device as recited in claim 1, in which said differential between front lighting and side lighting conditions corresponds to between about ¼ and ⅝ of an f-stop.

4. A photographic light responsive device as recited in claim 1, in which said convex portion of the shell is essentially hemispherical, and said side wall thereof is substantially cylindrical, said cylindrical side wall having an axial length of between about .09r and .53r, where r corresponds to the radius of said hemispherical portion of the shell.

5. A photographic light responsive device comprising a body structure, a translucent three dimensional light collecting shell projecting outwardly from said body structure in a predetermined front direction, a light sensitive element positioned behind said shell at a location to respond to light passing therethrough, means actuable by said light sensitive element in accordance with the light energization thereof, said shell being exposed to impingement thereon of light rays coming from any position within a wide acceptance angle extending from a direct front-lighting position rearwardly through 90 degrees to a direct side-lighting position and then extending rearwardly beyond said direct side-lighting position through a limited back-lighting angle substantially less than 90 degrees to a predetermined cut-off position, said body structure being constructed to block off from impingement on said shell light rays coming from farther back of the shell than said predetermined cut-off position, and means forming a highly light reflective exterior surface extending essentially along the periphery of said shell in close proximity thereto with the shell projecting three dimensionally in said predetermined front direction outwardly beyond the location of said reflective surface, said exterior reflective surface being of a tapering configuration progressively advancing radially inwardly and in said predetermined direction and facing angularly radially outwardly and in said predetermined direction at a location and angle such as to reflect outwardly away from the shell rays coming from said front-lighting position, but to reflect onto said shell at least some of the rays which impinge on said reflective exterior surface from a position within said limited back-lighting angle.

6. A photographic light responsive device as recited in claim 5, in which said periphery of the shell is essentially circular and said light reflective surface extends essentially annularly thereabout.

7. A photographic light responsive device as recited in claim 5, in which said light reflective surface is essentially frusto-conical in configuration.

8. A photographic light responsive device as recited in claim 5, in which said light reflective surface tapers at essentially an angle of between about 120 and 145 degrees with respect to a central axis of said shell extending in said direction.

9. A photographic light responsive device as recited in claim 5, in which said periphery of said shell is essentially circular and centered about an axis extending in said direction, said light reflective surface tapering essentially frustro-conically at an angle of approximately 135 degrees with respect to said axis.

10. A photographic light responsive device as recited in claim 5, in which said shell curves convexly as it advances in said direction.

11. A photographic light responsive device as recited in claim 5, in which said shell has a substantially cylindrical side wall portion disposed closely adjacent said exterior reflective surface.

12. A photographic light responsive device as recited in claim 5, in which said shell has a dome-like portion of approximately hemispherical configuration.

13. A photographic light responsive device as recited in claim 5, in which said means are actuable by said light sensitive element to positions corresponding to different f-stop settings for a camera, said shell having a forward convex portion shaped essentially convexly to collect light rays from either said direct front-lighting position or said direct side-lighting position and positions therebetween, said forward convex portion being dimensioned so that the light collected thereby from a front source at said front-lighting position and from a side source of equal intensity at said side-lighting position will actuate said means to call for a camera lens setting approximately one full f-stop more open under side-lighting conditions than under front-lighting conditions, other factors remaining the same, said shell having a translucent light passing side wall axially inwardly of the inner end of said convex portion and extending substantially exactly in said predetermined direction to respond almost entirely to side-lighting and not appreciably to front-lighting, said side wall of the shell being of sufficient axial length to reduce the differential between front-lighting and side-lighting conditions of said means to an amount corresponding to considerably less than one full f-stop.

14. A photographic light responsive device comprising a body structure, a translucent three dimensional light collecting shell projecting outwardly from said body structure in a predetermined front direction, a light sensitive element positioned behind said shell at a location to respond to light passing therethrough, means actuable by said light sensitive element in accordance with the light energization thereof, said shell having a dome-like outer portion of approximately hemispherical configuration centered about an axis extending in said direction, said shell having a substantially cylindrical side-wall portion axially inwardly of and merging with said hemispherical portion, said shell being exposed to impingement thereon of light rays coming from any position within a wide acceptance angle extending from a direct front-lighting position rearwardly through 90 degrees to a direct side-lighting position and then extending rearwardly beyond said direct side-lighting position through a limited back-lighting angle substantially less than 90 degrees to a predetermined cut-off position, said body structure being constructed to block off from impingement on said shell light rays coming from farther back of the shell than said predetermined cut-off position, and means forming a highly light reflective exterior surface extending essentially arcuately along the periphery of said shell in close proximity thereto at a location closely adjacent and axially inwardly of said cylindrical portion of the shell and with the shell projecting three dimensionally in said predetermined front direction outwardly beyond the location of said reflective surface, said exterior reflective surface being of a tapering configuration progressively advancing radially inwardly and in said predetermined direction and facing angularly radially outwardly and in said predetermined direction at a location and angle such as to reflect outwardly away from the shell rays coming from said front-lighting position, but to reflect onto said shell at least some of the rays which impinge on said reflective exterior surface from a position within said limited back-lighting angle.

15. A photographic light responsive device as recited in claim 14, in which said light reflective surface tapers essentially at an angle of between about 120 and 145 degrees with respect to said axis.

16. A photographic light responsive device as recited in claim 14, in which said light reflective surface has a coefficient of reflection of at least about .4 for all visible light.

References Cited in the file of this patent
UNITED STATES PATENTS

| | | |
|---|---|---|
| 2,206,196 | Kubitzek | July 2, 1940 |
| 2,214,283 | Norwood | Sept. 10, 1940 |
| 2,879,690 | Dunn | Mar. 31, 1959 |

FOREIGN PATENTS

| | | |
|---|---|---|
| 732,914 | Great Britain | June 29, 1955 |